(12) United States Patent
Martinosky et al.

(10) Patent No.: US 6,179,785 B1
(45) Date of Patent: Jan. 30, 2001

(54) AMBIENT SENSING FEATURE FOR THERMOMETER RECALIBRATION SYSTEM

(75) Inventors: Joseph W. Martinosky, Chesterfield; Bradford G. Clay, Maryland Heights; Frederick F. Schweitzer, Jr., Wildwood, all of MO (US)

(73) Assignee: Sherwood Services, AG, Schaffhausen (CH)

( * ) Notice: Under 35 U.S.C. 154(b), the term of this patent shall be extended for 0 days.

(21) Appl. No.: 08/951,061

(22) Filed: Oct. 15, 1997

Related U.S. Application Data (60) Provisional application No. 60/028,880, filed on Oct. 17, 1996.

(51) Int. Cl.$^7$ .................................................. A61B 5/00
(52) U.S. Cl. ............................................................ 600/549
(58) Field of Search ............................. 600/549; 364/557, 364/571.01; 374/1, 100

(56) References Cited

U.S. PATENT DOCUMENTS

| | | | |
|---|---|---|---|
| Re. 34,789 | 11/1994 | Fraden | 364/557 |
| 4,126,042 | 11/1978 | Lynch | 73/361 |
| 4,475,823 | 10/1984 | Stone | 374/1 |
| 4,532,601 | 7/1985 | Lenderking et al. | 364/571 |
| 4,722,612 | 2/1988 | Junkert et al. | 374/124 |
| 4,784,149 | 11/1988 | Berman et al. | 128/664 |
| 4,797,840 | 1/1989 | Fraden | 364/557 |
| 4,901,257 | 2/1990 | Chang et al. | 364/571.01 |
| 5,001,657 | 3/1991 | Yagura et al. | 364/557 |
| 5,176,146 * | 1/1993 | Maurice et al. | 600/549 |
| 5,183,337 | 2/1993 | Pompei | 374/2 |
| 5,333,784 | 8/1994 | Pompei | 236/91 C |

\* cited by examiner

*Primary Examiner*—Max Hindenburg
(74) *Attorney, Agent, or Firm*—Mark S. Leonardo; Brown, Rudnick, Freed & Gesmer, P.C.

(57) ABSTRACT

The present invention is directed to an ambient temperature recalibration subsystem for a recalibration system that recalibrates a tympanic thermometer. In particular, the present invention relates to a computer-related invention comprising a computer that is in communication with a tympanic thermometer which includes an ambient sensing subsystem for sensing the surrounding ambient temperature experienced by the tympanic thermometer. The ambient temperature recalibration subsystem makes several threshold determinations before recalibration of the tympanic thermometer is allowed to proceed. The computer first instructs the thermometer to take a plurality of ambient temperature readings for determining whether the current ambient temperature experienced by the thermometer is stable. Once the temperature stability of the tympanic thermometer is determined, the computer determines whether the ambient sensing subsystem is providing an accurate ambient temperature reading by cross referencing one ambient sensor against another in the ambient sensing subsystem. An average ambient temperature is then determined from the plurality of readings previously taken which is then corrected using a scaling factor. If the corrected ambient temperature falls within a predetermined range of ambient temperatures, the computer permits the recalibration procedure to proceed.

40 Claims, 5 Drawing Sheets

AMBIENT SENSING FEATURE FOR THERMOMETER RECALIBRATION SYSTEM

This application claims benefit of Provisional application Ser. No. 60/028,880, filed Oct. 17, 1996.

BACKGROUND OF THE INVENTION

1. Field of the Invention

The present invention generally relates to a calibration system for recalibrating electronic thermometers. More specifically, the present invention relates to recalibration system comprising a tympanic thermometer, a blackbody calibration unit and a computer for recalibrating the infrared temperature sensor within the tympanic thermometer. In particular, the present invention relates to a recalibration system for recalibrating tympanic thermometers using the ambient temperature sensed by the tympanic thermometer as a primary control parameter in the recalibration process.

2. Background Art

The diagnosis and treatment of many body ailments depends upon an accurate reading of the internal or core temperature of a patient's body temperature reading, and in some instances, upon comparison to a previous body temperature. For many years, the most common way of taking a patient's temperature involved utilization of Mercury thermometers. However, such thermometers are susceptible to breaking and must be inserted and maintained in the rectum or mouth for several minutes, often causing discomfort to the patient.

Because of the drawbacks of conventional Mercury thermometers, electronic thermometers were developed and are now in widespread use. Although electronic thermometers provide relatively more accurate temperature readings than Mercury thermometers, they nevertheless share may of the same drawbacks. For example, even though electronic thermometers provide faster readings, a half a minute must still pass before an accurate reading can be taken. Finally, electronic thermometers must still be inserted into the patient's mouth, rectum or axilla.

Tympanic thermometers provide nearly instantaneous and accurate readings of core temperature without undue delay attendant with other thermometers. The tympanic thermometer is generally considered by the medical community to be superior to oral, rectal or axillary sites for taking a patient's temperature. This is because the tympanic membrane is more representative of the body's internal or core temperature and more responsive to changes in core temperature. Tympanic thermometers, those thermometers that sense the infrared emissions from the tympanic membrane, offer significant advantages over Mercury or conventional electronic thermometers.

Recent efforts to provide a method and apparatus for measuring temperature of the tympanic membrane have produced several excellent infrared tympanic thermometers. For example, U.S. Pat. No. 5,293,877 to O'Hara et al. provides for a tympanic thermometer that measures internal body temperature utilizing the infrared emissions from the tympanic membrane of the ear, and is herein incorporated by reference in its entirety. Typically, tympanic thermometers require calibration at the factory during manufacturing in order achieve the quick and accurate temperature reading capability noted above. Calibration of the tympanic thermometer at the factory requires individual calibration of each thermometer unit so that the proper calibration parameters can be written to the EEPROM of each thermometer's microprocessor. These calibration parameters involve determining the proper values for variables representing the sensors within each thermometer. Once these calibration parameters are determined and written to the memory of each thermometer, calibration is complete and the unit is shipped for sale.

However, responsivity of the infrared system and transmissivity of the optical system set during calibration can change over time, thereby bringing the tympanic thermometer out of calibration which results in inaccurate temperature readings being taken by the thermometer. Responsivity of the tympanic thermometer's infrared system involves changes in the response characteristics of the thermal radiation sensor of the thermometer over time. Similarly, transmissivity of the optical system deals with the transmission characteristics of the optical waveguide and other parts of the thermometer's optical system that may drift or change as a function of time or due to scratches and deformations that occur during use. During recalibration, the calibration parameters dealing with the thermometer's infrared and optical systems are adjusted.

Recalibration of the tympanic thermometer usually requires recalibrating the variables related to the infrared and optical subsystems of the thermometer incorporated in the calibration equations written to the EEPROM during factory calibration. A prior art recalibration device usually comprises a unit housing one or more blackbodies that permit the user to recalibrate the thermometer at one or more set temperatures designated for each blackbody. In operation, the sensor portion of the thermometer is inserted into a cavity containing a blackbody set at a predetermined temperature. Readings are then taken from each sensor and a set of calibration parameters are calculated and written over the original parameters set in the EEPROM.

Ambient temperature is another important calibration parameter that must be determined during the recalibration procedure because it provides an indication of temperature stability of the surrounding environment that the tympanic thermometer is experiencing prior to recalibration. Temperature stability permits accurate recalibration to take place as long as recalibration is within a specific range of ambient temperature conditions. For example, a tympanic thermometer experiencing an ambient temperature that is too high or otherwise outside the permissible range of ambient temperatures will adversely affect the recalibration process and result in an inaccurate calibration of the thermometer.

To sense the ambient conditions being experienced by the tympanic thermometer, prior art recalibration devices have utilized an ambient sensor that resides directly on the recalibration device itself for sensing the surrounding ambient temperature prior to recalibration. Although this method provides an easy means of determining ambient temperature, several disadvantages remain. For example, a more accurate ambient temperature reading of the tympanic thermometer is best taken from the thermometer itself rather than from the recalibration device since temperature stability of the tympanic thermometer is a far more critical factor than the temperature stability of the room containing the recalibration device. Further, instances may occur where a tympanic thermometer to be recalibrated might have just been stored in a high temperature area, such as a the compartment of a vehicle exposed to the sun or in a room having different environmental conditions than the room where recalibration is occurring. In this instance, the ambient temperature of the tympanic thermometer will be much higher than the surrounding cooler temperature of the room sensed by the calibration device's ambient sensor, thereby providing an inaccurate ambient temperature reading to the recalibration device since the thermometer has not stabilized to its surroundings. However, if the recalibration system takes into account the present ambient temperature experienced by the tympanic thermometer itself prior to recalibration, then a more accurate and reliable determination of the thermometer's temperature stability can be determined before recalibration occurs.

As of yet, nothing in the prior art has addressed the problem of developing an ambient sensor system that determines the temperature stability of the tympanic thermometer before recalibration of the thermometer occurs. Further, nothing in the prior art has addressed the problem of ensuring that recalibration takes place in an environment where ambient temperature is within a stable range of temperatures.

Therefore, there exists a need in the medical art for an ambient sensor system that takes an ambient temperature reading from within the thermometer itself without use of separate ambient sensors outside the thermometer and also incorporates a fail-safe routine whereby recalibration does not occur unless the ambient temperature of the thermometer is within a predetermined range and the thermometer is in a state of thermal equilibrium.

BRIEF SUMMARY AND OBJECTS OF THE INVENTION

In brief summary, the present invention relates to an ambient sensor feature for a recalibration system that provides a fail safe method of recalibrating a tympanic thermometer or other radiation-sensing device in a temperature stable environment before recalibration occurs. The recalibration system of the present invention comprises a recalibration device that performs the recalibration procedure on a tympanic thermometer and a computer for initiating and managing the recalibration procedure.

Accordingly, it is an object of the present invention to provide a novel and accurate means of determining ambient temperature prior to recalibration of a tympanic thermometer.

A further object of the present invention is to provide a method for determining temperature stability based on ambient temperature.

Another paramount object of the present invention is to provide an ambient temperature reading taken directly from the tympanic thermometer being recalibrated.

It is a principal object of the present invention to provide a means of ensuring that recalibration of a tympanic thermometer is performed in an environment that is within a specific ambient temperature range.

These and other objects of the present invention are realized in a presently preferred embodiment thereof, described by way of example and not necessarily by way of limitation, which provides for an ambient sensor feature that takes an ambient temperature reading of a tympanic thermometer prior to recalibration and permits recalibration only when the ambient temperature conditions experienced by the thermometer is within a predetermined range.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE PREFERRED EMBODIMENTS

Figure 1:
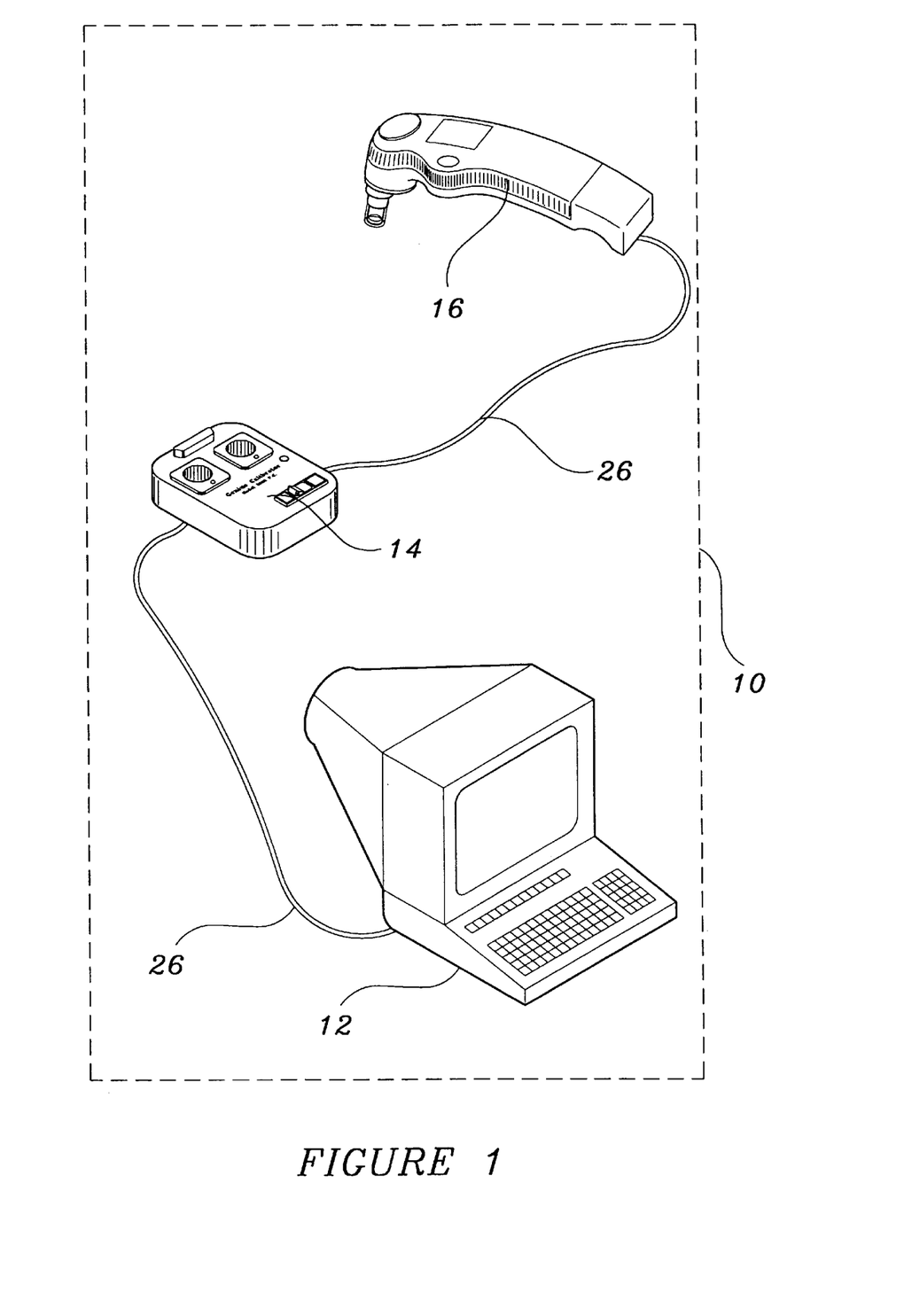
FIG. 1 is perspective view of the recalibration system showing the recalibration device, tympanic thermometer and computer according to the present invention.

FIG. 1 illustrates the main apparatus components of the recalibration system 10. The recalibration system 11 includes a recalibration device 14 that is connected to a computer 12 through a data link 26. The data link according to the present invention can be serial, parallel, or custom data link suitable for transmission of data, commands or status between components. preferably, the data link is a tethered serial data link. The recalibration device 14 is also connected through another data link 26 to a tympanic thermometer 16 that is to be recalibrated. The computer 12 communicates with the tympanic thermometer 16 through these links 26. Recalibration instructions are stored in the memory (not shown) of the computer 12 which also holds the instructions that comprise the ambient temperature recalibration subsystem according to the present invention. The recalibration device can be any apparatus used to calibrate radiation-sensing type thermometers, such as a tympanic thermometer. Preferably, the recalibration device comprises one or more heated blackbodies that are used to modify the calibration coefficients stored in the thermometer's memory during factory calibration, although any type of recalibration device suitable for recalibrating a thermometer as described above is felt to all within the scope of the present invention.

Figure 2:
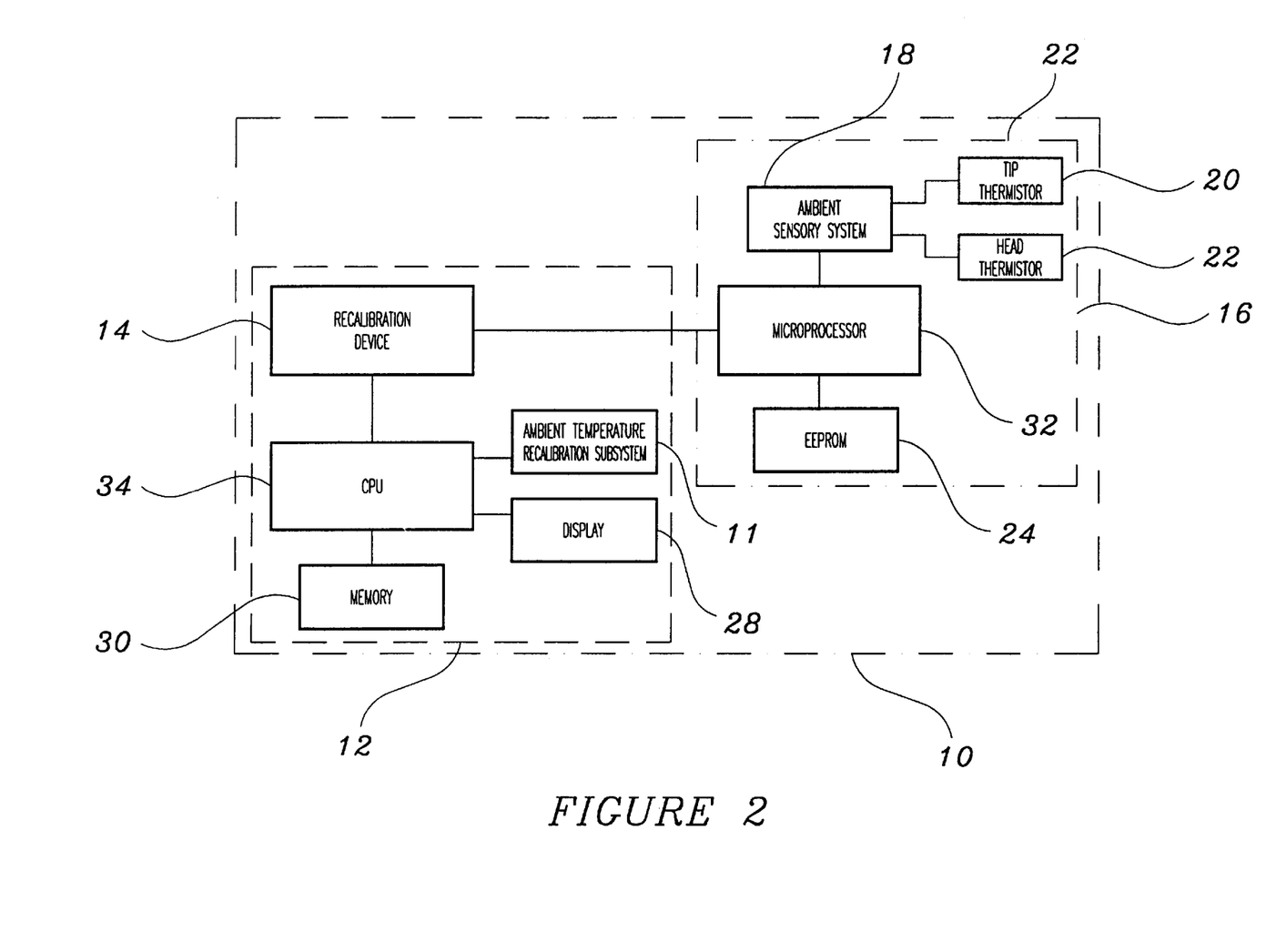
FIG. 2 is a simplified block diagram of the constituent subsystems of the recalibration system showing in particular the ambient temperature recalibration subsystem according to the present invention.

As shown in FIG. 2, a simplified block diagram illustrating the various components of the recalibration system 10 showing the recalibration device 14, the tympanic thermometer 16 and the computer 12 along with their constituent components and subsystems, and in particular the ambient temperature recalibration subsystem 11 according to the present invention.

Computer 12 includes a CPU 34, memory 30, display 28 and the ambient temperature recalibration subsystem 11 according to the present invention. The CPU 34 contains the arithmetic and logic processing circuits of computer 12, including the main control circuits needed to sequence the execution of instructions from the ambient temperature recalibration subsystem 11. The memory 30 stores any information transmitted by the tympanic thermometer 16 to the computer 12 while the display 28 displays information and instructions to the user during the recalibration procedure.

Tympanic thermometer 16 includes a microprocessor 32 and an ambient sensing system 18 that comprises a head thermistor 20 and tip thermistor 22. The microprocessor 32 carries out the computer operations of the tympanic thermometer 16 comprising instruction fetch, execution, interrupt and management of addresses, data and control lines which are connected to microprocessor 32. The thermistors 20 and 22 are conventional thermistors and are preferably model number SC35F103B manufactured by THERMO-METRICS of Edison, New Jersey, however any resistive thermal sensors suitable for sensing ambient temperature are felt to fall with the scope of the present invention.

The head thermistor 20 is located in thermal proximity to a thermal radiation detector (not shown) inside the tympanic thermometer 16 and provides ambient temperature readings to the computer 12. The thermal radiation detector can be any device that converts radiant energy to some other measurable form. This can be an electrical current or a change in some physical property of the detector. As a fail safe measure, the tip thermistor 22 located near the optical subsystem of the tympanic thermometer 16 also provides ambient temperature readings to the computer 16. Finally, the tympanic thermometer 16 includes an EEPROM 24 that stores the calibration coefficients generated during factory calibration, identifying indicia of the particular tympanic thermometer 16 being calibrated and the Maximum/Minimum Head thermistor A/D counts for the head thermistor 20. The A/D counts are the digitized voltage readings taken from an analog-to-digital converter of a thermistor in a resistive voltage divider.

The maximum and minimum A/D counts from the head thermistor 20 are counts set during factory calibration that represent the maximum and minimum A/D counts registered by the thermistor 20 for corresponding maximum and minimum ambient temperatures of 60° F. and 100° F. respectively. These two pre-set temperature and parts represent the maximum and minimum range of ambient temperatures that the tympanic thermometer 16 is expected to operate in, although any end points suitable for a device that measures infrared radiation is felt to fall within the scope of the present invention. Further, these pre-set ambient temperatures form the end points for a linear approximation technique that the computer 12 employs to determine present ambient temperatures sensed by the head thermistor 20 in order for the computer 12 to convert the A/D counts registered by the thermistor 20 to real ambient temperatures.

Figure 3:
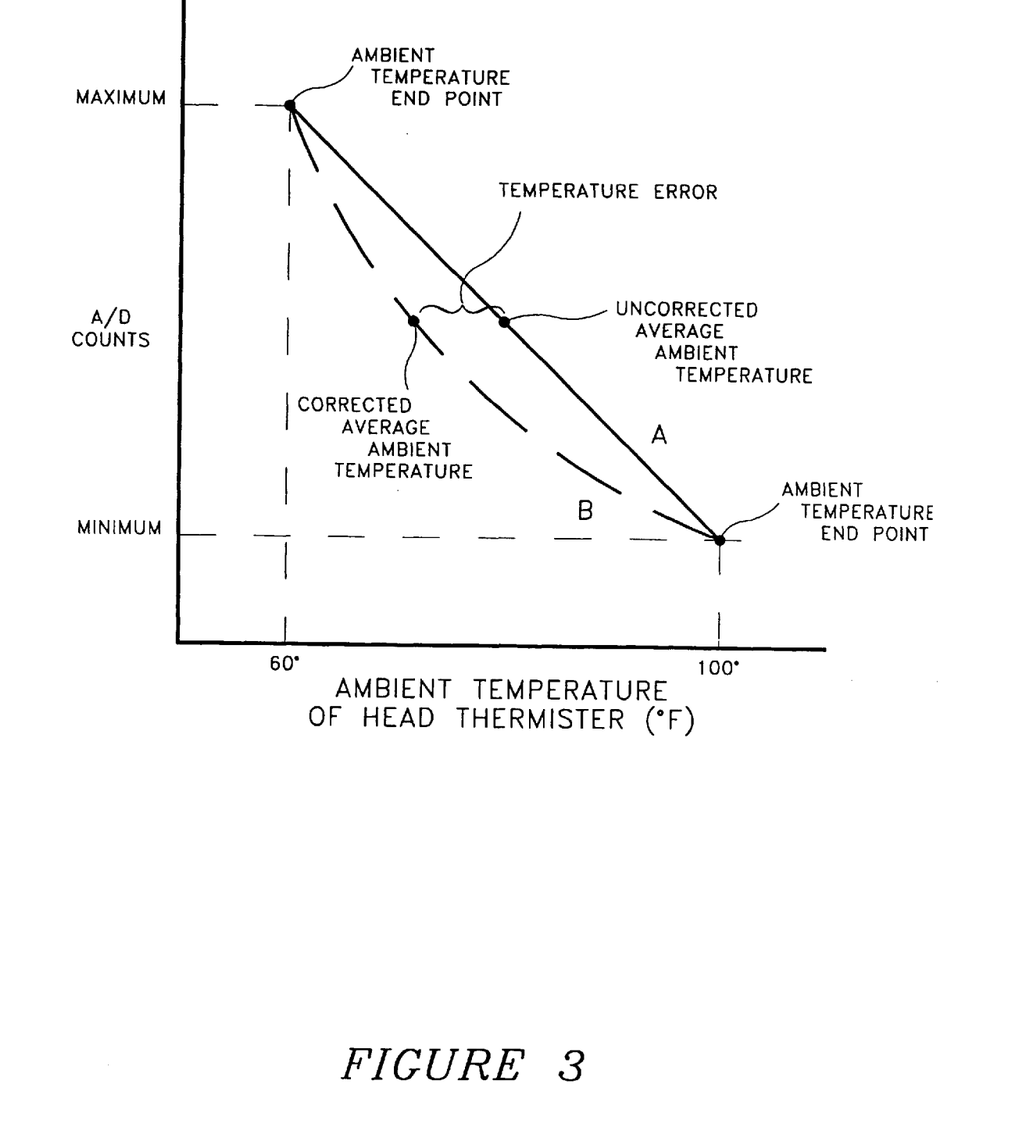
FIG. 3 is a graph showing the relationship between Head Thermistor A/D count and ambient temperature.

FIG. 3 shows the relationship between the head thermistor A/D counts and corresponding ambient temperatures using the linear approximation technique. As noted above, the ambient temperature end points are set at 60° F. and 100° F. and correspond to A/D counts for these particular ambient temperatures as determined by the manufacturer. These established end points then form a linear approximation line A that run through those end points.

The linear approximation line A is a model that allows the computer 12 to determine the corresponding ambient temperature for any particular A/D count generated by the head thermistor 20 that is between the ambient temperatures of 60° F. and 100° F. However, the linear approximation technique employed by the computer 12 has to use a scaling factor in order to derive the real ambient temperature being sensed by the head thermistor 20 since the real conversion factor is unknown. The real ambient temperature values are shown on nominal thermistor curve B with the difference between curve B and the linear approximation line A for any one A/D count being the temperature error that requires scaling. The scaling factor employed by the computer 12 uses Lagrange polynomials. The functional expression of the Lagrange polynomial used is:

$$F(x) = *(x-x1)*(x-x2)$$

where X1=the resistance at one end point, and X2=the resistance of the other endpoint, and is a scaling factor used to make the function fit the desired nominal thermistor curve B. The scaling factor is determined experimentally by comparing the linear approximation line A to the nominal thermistor curve B provided by the thermistor manufacturer. The scaling factor is then added to the temperature calculated from the linear relationship derived from the two end points in order to correct temperature error due to the linear approximation technique employed by the computer 12. The scaling factor minimizes the error in determining a real ambient temperature between an ambient temperature range of 70° F. and 85° F. since this is the range where the most temperature error occurs as illustrated in FIG. 3. The variables X1 and X2 are shown in terms of resistance since the head thermistor 20 is a temperature sensitive resistor that outputs sensed ambient temperatures in terms of resistance which is then converted by an Analog-to-Digital converter (not shown) into A/D counts used to derive the real ambient temperature being sensed by thermistor 20. Preliminary testing of the scaling factor has shown a good correlation to room temperature with agreement between tympanic thermometers using this scaling factor and a calibrated thermocouple of within 0.5° F.

Figure 4:
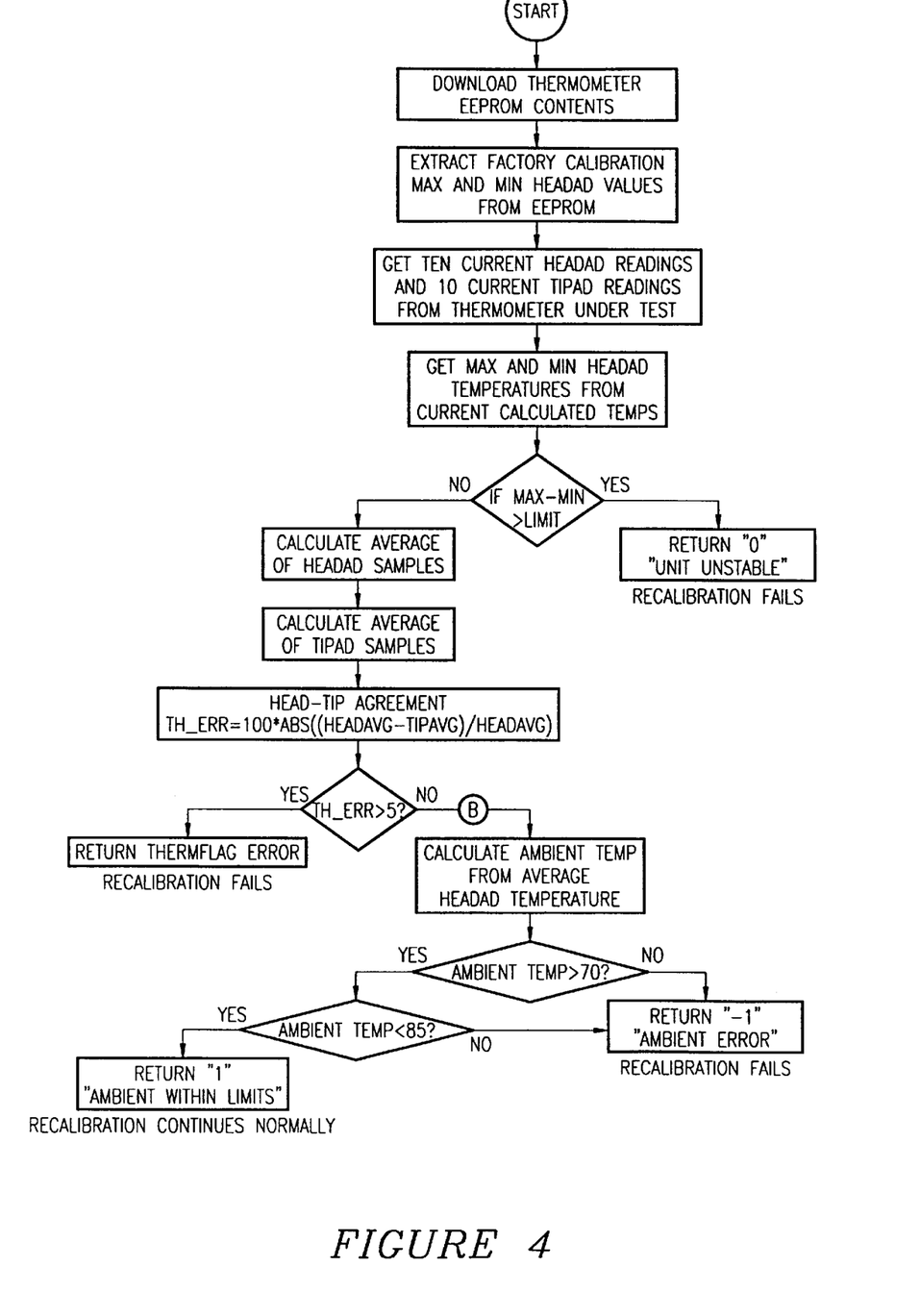
FIG. 4 is a flow chart showing the steps used to determine whether the ambient temperature sensed by the tympanic thermometer is within a predetermined range of ambient temperatures in order to determine whether recalibration can occur according to the present invention.
Figure 5:
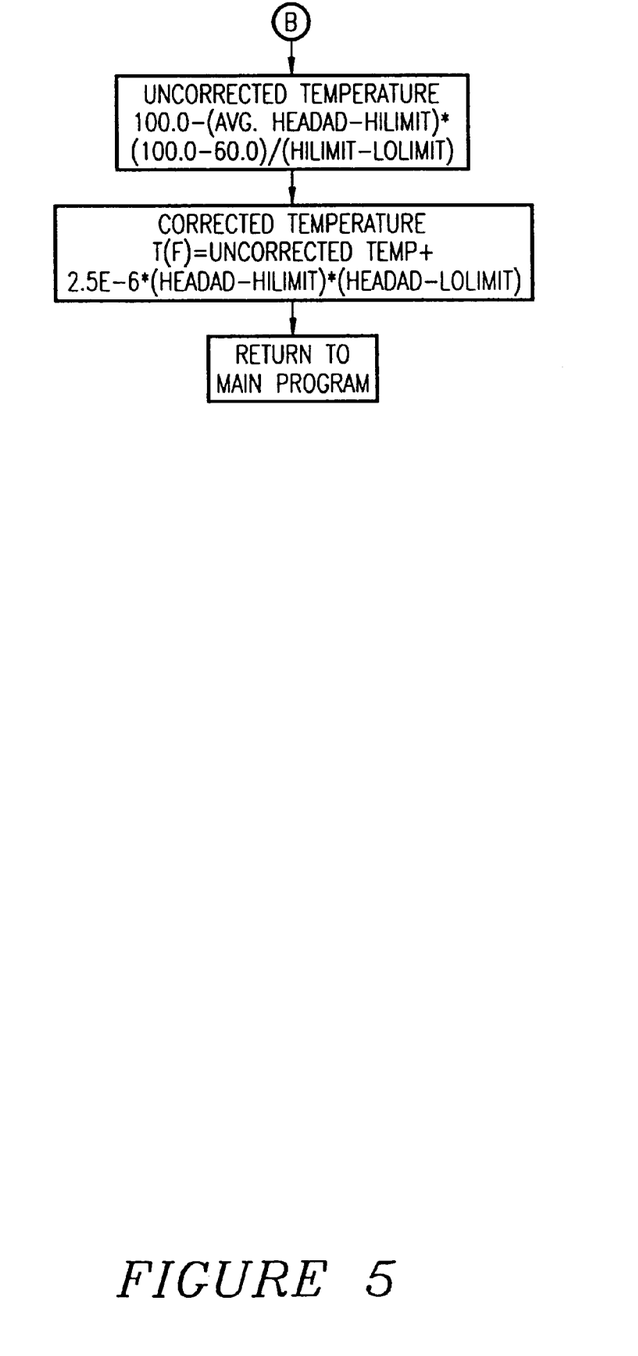
FIG. 5 is a flow chart showing a subroutine used to calculate ambient temperature according to the present invention.

Referring to FIGS. 4–5, a flow chart of the ambient temperature subsystem 11 is shown illustrating the steps used by the computer 12 in determining the ambient temperature stability of the tympanic thermometer 16 before recalibration as well as determining whether the real ambient temperature sensed by the head thermistor 20 falls within the range of temperatures that allows recalibration of the thermometer 16 to occur. As shown in FIG. 4, the computer 12 instructs the thermometer's 16 microprocessor 32 to download its EEPROM 24 contents to the computer 12 through the tethered serial date link 26. The contents of the EEPROM 24 contains the calibration coefficients used to calibrate the tympanic thermometer 12 during factory calibration, identifying indicia that identifies the particular tympanic thermometer being recalibrated, and the maximum and minimum head thermistor 20 A/D counts recorded during factory calibration. Once the computer 12 receives the stored information from the EEPROM 24, the computer 12 further instructs the tympanic thermometer 16 to take 10 present ambient A/D samples each from both the head thermistor 20 and tip thermistor 22. The tympanic thermometer 16 then forwards these readings to the computer 12 which loops through each set of ten thermistor readings and determines the maximum and minimum A/D counts for the head thermistor 20 and tip thermistor 22.

In order to determine whether the tympanic thermometer 16 is temperature stable with respect to the ambient temperature being experienced by thermometer 16, the computer 12 subtracts the maximum A/D count from the minimum A/D count derived from the ten readings previously taken from the head thermistor 20 to produce a difference value, delta. The computer 12 then compares delta against a predetermined threshold value stored in the computer's 12 memory. If delta exceeds the predetermined threshold, a "Unit Unstable" message is displayed by the computer 12 and the recalibration procedure is aborted. If delta does not exceed the predetermined threshold, the tympanic thermometer 16 is consider stable. Preferably, the predetermined threshold value is 10 A/D counts.

Once the stability of the tympanic thermometer 16 is determined, the ambient temperature reading accuracy of the head thermistor 20 is checked. In order to determine the temperature reading accuracy of the head thermistor 20, the computer 12 calculates the average A/D count from the ten current ambient temperature readings previously taken from the head thermistor 20. Once the average head thermistor 20

A/D count is determined, the computer 12 calculates the average A/D count from the ten current ambient temperature readings previously taken from the tip thermistor 22. The tip thermistor 22 is used as a safeguard to ensure the head thermistor 20 is operating properly and giving accurate ambient temperature readings to the computer 12 by comparing the ambient temperatures recorded by both thermistors 20 and 22. The equation used to determine the error between the head thermistor 20 and the tip thermistor 22 is:

Error=100*abs(HEADAVG−TIPAVG)/HEADAVG)

where HEADAVG is the average of 10 ambient temperature readings taken from the head thermistor 20; TIPAVG is the average of 10 ambient temperature readings taken from the tip thermistor 22; and abs is an absolute value that ensures a positive value is derived for the error. If the error calculated is above the manufacturer's quoted 5% tolerance, then the computer 12 directs a "thermflag" error message be written to the computer's 12 display and the recalibration procedure is aborted. However, if the error calculated is below the manufacturer's tolerance, the computer 12 enters a subroutine A whereby the corrected ambient temperature is eventually calculated.

Before the corrected ambient temperature can be determined, the uncorrected ambient temperature is calculated employing the linear approximation technique disclosed above. When computer 12 enters subroutine A the uncorrected temperature is calculated from the following equation:

uncorrected temperature=100° F.−(HEADAVG−HILIMIT)*(100° F.−60° F./HILIMIT−LOLIMIT)

wherein HEADAVG is the average ambient temperature taken from the ten temperature readings taken from the head thermistor 20; HILIMIT is the 100° F. ambient temperature end point in A/D counts; and the LOLIMIT is the 60° F. ambient temperature end point in A/D counts. Once the uncorrected ambient temperature is derived, the corrected ambient temperature is calculated by adding in the scaling factor, F(x), to the uncorrected temperature as follows:

Corrected Temperature=Uncorr. Temp.+2.5*10$^{-6}$*(HEADAVG−HILIMIT)*(HEADAV−LOLIMIT)

wherein Uncorr. Temp. is the uncorrected temperature; HEADAVG is the average ambient temperature taken from the ten temperature readings from the head thermistor 20; HILIMIT is the 100° F. ambient temperature end point in A/D counts; and the LOLIMIT is the 60° F. ambient temperature end point in A/D counts. After the corrected ambient temperature is calculated, the computer 12 returns to the main program to determine whether the corrected ambient temperature is within a predetermined range of ambient temperatures.

After the temperature stability of the tympanic thermometer 16 and the accuracy of the head thermistor 20 are determined, the computer 12 must ensure that the recalibration procedure occurs in an ambient environment that is within a predetermined ambient temperature range. Once the corrected ambient temperature is determined, the computer 12 compares that ambient temperature against an ambient temperature range between 70° F. and 85° F. If the corrected ambient temperature falls outside that predetermined range, the computer 12 writes a "−1" and "ambient error" to the display 28 and the recalibration procedure is aborted. However, if the corrected ambient temperature falls inside the predetermined range, then the computer 12 writes a "1" and "Ambient within Limits" to the display 28 and the recalibration procedure is allowed to run. Preferably, the ambient temperature range for permitting the recalibration procedure to begin is between 70° F. and 85° F. as noted above, however any suitable ambient temperature range that allows for recalibration of a tympanic thermometer without adversely affecting recalibration is felt to fall within the scope of the present invention.

The computer 12 of the present invention is preferably a personal computer or other type of computer that has sufficient computational power to run the instructions illustrated in FIGS. 4–5. The computer 12 may also be utilized to archive and store the recalibration parameters as well as the calibration coefficients for individual tympanic thermometers. In this manner, a user may retrieve from memory calibration statistics for any number of tympanic thermometers that have been recalibrated over a period of time by the computer 12. Further, the thermometer to be recalibrated is preferably a tympanic thermometer as disclosed in U.S. Pat. No. 5,293,877 to O'Hara et al., however any thermometer that utilizes infrared radiation to determine the core body temperature of a person and includes an internal ambient sensor is felt to fall within the scope of the present invention.

In an alternative embodiment, the tympanic thermometer 16 may be linked directly to the computer 12 through the tethered serial data link 26 without having the recalibration device 14 interposed therebetween.

In another alternative embodiment, the computer 12 may also function as an archiving means whereby past calibration coefficients and other kinds of information for any particular thermometer may be stored in memory 30 for future reference and use.

Although the invention has been described with reference to specific embodiments, this description is not meant to be construed in a limiting sense. Various modifications of the disclosed embodiments, as well as alternative embodiments of the invention will become apparent to persons skilled in the art upon reference to the description of the invention. It is therefore contemplated that the appended claims will cover such modifications that fall within the scope of the invention.

We claim:

1. A recalibration system for initiating a recalibration procedure comprising:
   a thermometer, said thermometer including at least one sensor, said at least one sensor taking a plurality of ambient temperature readings from said thermometer; and
   a computer linked to said thermometer, said computer instructing said thermometer to transmit said plurality of ambient temperature reading s to said computer, wherein said computer determines from said plurality of ambient temperature readings whether said thermometer is temperature stable, if said thermometer is temperature stable then said computer permits the recalibration procedure to proceed and if said thermometer is not temperature stable then said computer aborts the recalibration procedure.

2. The recalibration system according to claim 1, wherein temperature stability of the thermometer is determined by said computer taking a maximum ambient temperature reading and a minimum ambient temperature reading from said plurality of ambient temperature readings and determining a difference between said maximum and minimum ambient temperature readings, if said difference falls within a predetermined range then said thermometer is temperature stable.

3. The recalibration system according to claim 1, wherein said thermometer is a radiation sensing thermometer.

4. The recalibration system according to claim 2, wherein said radiation sensing thermometer is a tympanic thermometer.

5. The recalibration system according to claim 1, wherein said at least one sensor comprises a head thermistor and a tip thermistor.

6. The recalibration system according to claim 5, wherein the head thermistor is in thermal proximity to a thermal radiation detector.

7. The recalibration system according to claim 5, wherein the tip thermistor is remotely located from a thermal radiation detector.

8. The recalibration system according to claim 1, wherein said computer is linked to said thermometer through a serial data link.

9. A recalibration system for initiating a recalibration procedure comprising:
- a thermometer, said thermometer including at least one sensor, said at least one sensor taking a plurality of ambient temperature readings from said thermometer; and
- a computer linked to said thermometer, said computer instructing said thermometer to transmit said plurality of ambient temperatures to said computer, wherein said computer determines whether an average corrected ambient temperature reading derived from said plurality of ambient temperatures is within a predetermined range of ambient temperatures, if said average corrected ambient temperature reading is within said predetermined range then said computer permits the recalibration procedure to proceed and if said average corrected ambient temperature reading is not within said predetermined range then said computer aborts the recalibration procedure.

10. The recalibration system according to claim 9 wherein said thermometer is a radiation sensing thermometer.

11. The recalibration system according to claim 10, wherein said radiation sensing thermometer is a tympanic thermometer.

12. The recalibration system according to claim 9, wherein said at least one sensor comprises a head thermistor and a tip thermistor.

13. The recalibration system according to claim 12, wherein the head thermistor is in thermal proximity to a thermal radiation detector.

14. The recalibration system according to claim 12, wherein the tip thermistor is remotely located from a thermal radiation detector.

15. The recalibration system according to claim 9, wherein said computer is linked to said thermometer through a data link.

16. The recalibration system according to claim 9, wherein said average corrected ambient temperature reading is the average value of said plurality of ambient temperature readings.

17. The recalibration system according to claim 9, wherein average corrected ambient temperature reading is corrected using the following equation:

$$\text{Corrected Ambient Temperature} = \text{Uncorrected Ambient Temperature} + 2.5 \times 10^{-6} \times (\text{HEADAVG} - \text{HILIMIT}) \times (\text{HEADAVG} - \text{LOLIMIT})$$

wherein HEADAVG is the average ambient temperature reading derived from said plurality of ambient temperature readings; the HILIMIT is maximum ambient temperature end point in A/D counts; and LOLIMIT is the minimum ambient temperature end point in A/D counts.

18. The recalibration system according to claim 17, wherein the uncorrected ambient temperature is derived using the following equation:

$$\text{Uncorrected Temperature} = 100° \text{F.} - (\text{HEADAVG} - \text{HILIMIT}) \times (100° \text{F.} - 60° \text{F.}) / (\text{HILIMIT} - \text{LOLIMIT})$$

wherein HEADAVG is the average ambient temperature taken from the ten temperature readings taken from the head thermistor; HILIMIT is the 100° F. ambient temperature end point in A/D counts; and the LOLIMIT is the 60° F. ambient temperature end point in A/D counts.

19. The recalibration system according to claim 9, wherein said predetermined range is between 70° F. and 85° F.

20. A recalibration system for initiating a recalibration procedure comprising:
- a thermometer, said thermometer including at least two sensors, said at least two sensors each taking a plurality of ambient temperature readings from said thermometer; and
- a computer linked to said thermometer, said computer instructing said thermometer to transmit said plurality of ambient temperature readings from each of said at least two sensors to said computer, wherein said computer determines whether a one of said at least two sensors are reading a correct ambient temperature, if said one of said at least two sensors is reading a correct ambient temperature then said computer permits the recalibration procedure to proceed and if said one of said at least two sensors is not reading a correct ambient temperature then said computer aborts the recalibration procedure.

21. The recalibration system according to claim 20, wherein said at least two sensors comprises a tip thermistor and a head thermistor.

22. The recalibration system according to claim 21, wherein said computer determines the average ambient temperature from said plurality of ambient temperature readings for said tip thermistor and said head thermistor, said computer determining the difference value from said average ambient temperature between said tip thermistor and said head thermistor, if said difference value is less than a predetermined threshold said head thermistor is measuring a correct ambient temperature and if said difference value is greater than a predetermined threshold said head thermistor is measuring an incorrect ambient temperature.

23. The recalibration system according to claim 20, wherein said computer is linked to said thermometer through a data link.

24. A recalibration system for initiating a recalibration procedure comprising:
- a thermometer, said thermometer including at least one sensor, said at least one sensor taking a plurality of ambient temperature readings from said thermometer; and
- a computer linked to said thermometer, said computer instructing said thermometer to transmit said plurality of ambient temperature readings to said computer, wherein said computer determines from said plurality of ambient temperature readings whether said thermometer is temperature stable, if said thermometer is temperature stable then said computer permits the recalibration procedure to proceed and if said thermometer is not temperature stable then said computer aborts the recalibration procedure, wherein said computer then determines whether at least one sensor is reading a correct ambient temperature, if said at least one sensor is reading a correct ambient temperature then said computer permits the recalibration procedure to proceed and if said at least one sensor is not reading a correct ambient temperature then said computer aborts the recalibration procedure, wherein said computer then determines whether an average corrected ambient temperature reading derived from said plurality of ambient temperature readings is within a predetermined range of ambient temperatures, if said plurality of ambient temperature readings is within said predetermined range then said computer permits the recalibration procedure to proceed and if said plurality of ambient temperature readings is not within said predetermined range then said computer aborts the recalibration procedure.

25. The recalibration system according to claim 24, wherein temperature stability of the thermometer is determined by said computer taking a maximum ambient temperature reading and a minimum ambient temperature reading from said plurality of ambient temperatures and determining a difference between said maximum and minimum ambient temperature readings, if said difference falls within a predetermined range then said thermometer is temperature stable.

26. The recalibration system according to claim 24, wherein said thermometer is a radiation sensing thermometer.

27. The recalibration system according to claim 26, wherein said radiation sensing thermometer is a tympanic thermometer.

28. The recalibration system according to claim 24, wherein said at least one sensor comprises a head thermistor and a tip thermistor.

29. The recalibration system according to claim 28, wherein the head thermistor is in thermal proximity to a thermal radiation detector.

30. The recalibration system according to claim 28, wherein the tip thermistor is remotely located from a thermal radiation detector.

31. The recalibration system according to claim 24, wherein said computer is linked to said thermometer through a data link.

32. The recalibration system according to claim 24, wherein said average corrected ambient temperature is the average value of said plurality of ambient temperatures.

33. The recalibration system according to claim 32, wherein average corrected ambient temperature is corrected using the following equation:

Corrected Ambient Temperature=Uncorrected Ambient Temperature+$2.5*10^{-6}*$(HEADAVG−HILIMIT)*(HEADAVG−LOLIMIT)

wherein HEADAVG is the average ambient temperature reading derived from said plurality of ambient temperatures; the HILIMIT is 100° F. ambient temperature end point in A/D counts; and LOLIMIT is the 60° F. ambient temperature end point in A/D counts.

34. The recalibration system according to claim 33, wherein the uncorrected ambient temperature is derived using the following equation:

Uncorrected Temperature=100° F.−(HEADAVG−HILIMIT)*(100° F.−60° F./(HILIMIT−LOLIMIT)

wherein HEADAVG is the average ambient temperature taken from the ten temperature readings taken from the head thermistor; HILIMIT is the 100° F. ambient temperature end point in A/D counts; and the LOLIMIT is the 60° F. ambient temperature end point in A/D counts.

35. The recalibration system according to claim 24, wherein said predetermined range is between 70° F. and 85° F.

36. A method for initiating a recalibration procedure comprising:
providing a thermometer, said thermometer including at least one sensor, said at least one sensor taking a plurality of ambient temperature readings from said thermometer;
establishing a computer link between said thermometer and a computer;
instructing said thermometer to transmit said plurality of ambient temperature readings to said computer, wherein said computer determines from said plurality of ambient temperature readings whether said thermometer is temperature stable, if said thermometer is temperature stable then said computer permits the recalibration procedure to proceed and if said thermometer is not temperature stable then said computer aborts the recalibration procedure.

37. A method for initiating a recalibration procedure comprising:
providing a thermometer, said thermometer including at least one sensor, said at least one sensor taking a plurality of ambient temperature readings from said thermometer;
establishing a computer link between said thermometer and a computer;
instructing said thermometer to transmit said plurality of ambient temperature readings to said computer, wherein said computer determines whether an average corrected ambient temperature readings derived from said plurality of ambient temperature readings is within a predetermined range of ambient temperatures, if said average corrected ambient temperature reading is within said predetermined range then said computer permits the recalibration procedure to proceed and if said average corrected ambient temperature reading is not within said predetermined range then said computer aborts the recalibration procedure.

38. A method for initiating a recalibration procedure comprising:
providing a thermometer, said thermometer including at least two sensors, said at least two sensors sensing a plurality of ambient temperature readings from said thermometer;
establishing a computer link between said thermometer and a computer;
instructing said thermometer to transmit said plurality of ambient temperature readings to said computer, wherein said computer determines whether a one of said at least two sensors is reading a correct ambient temperature, if said one of said at least two sensors is reading a correct ambient temperature then said computer permits the recalibration procedure to proceed and if said one of said at least two sensors is not reading a correct ambient temperature then said computer aborts the recalibration procedure.

39. The method according to claim 38, wherein said at least two ambient temperature sensors comprises a tip thermistor and a head thermistor.

40. The method according to claim 39, wherein said computer determines the average ambient temperature reading from said plurality of ambient temperature readings for said tip thermistor and said head thermistor, said computer determining the difference value from said average ambient temperature reading between said tip thermistor and said head thermistor, if said difference value is greater than a predetermined threshold said head thermistor is measuring a correct ambient temperature and if said difference value is less than a predetermined threshold said head thermistor is measuring an incorrect ambient temperature.

* * * * *